United States Statutory Invention Registration [19]

[11] Reg. Number: H194

Oakley [43] Published: Jan. 6, 1987

[54] DECONTAMINATION APPARATUS AND METHOD

[75] Inventor: David J. Oakley, Richland, Wash.

[73] Assignee: The United States of America as represented by the United States Department of Energy, Washington, D.C.

[21] Appl. No.: 562,148

[22] Filed: Dec. 16, 1983

[51] Int. Cl.[4] ..... G21C 19/42

[52] U.S. Cl. ..... 376/310; 376/316; 134/199

[58] Field of Search ..... 376/310, 316; 134/199, 134/122 R; 68/5 E; 34/242; 432/242

[56] References Cited

U.S. PATENT DOCUMENTS

| | | | |
|---|---|---|---|
| 860,199 | 7/1907 | Emerson . | |
| 1,910,497 | 5/1933 | Peik | 134/199 X |
| 4,064,582 | 12/1977 | Sando et al. | 34/242 X |
| 4,296,556 | 10/1981 | Bray . | |
| 4,401,619 | 8/1983 | McEdwards | 376/310 X |
| 4,461,650 | 7/1984 | Ozawa | 376/310 X |

FOREIGN PATENT DOCUMENTS 817750 3/1981 U.S.S.R. .

OTHER PUBLICATIONS

Nielsen et al., "Wash and Dry Apparatus" IBM Technical Disclosure Bulletin, vol. 18, No. 5, (Oct. 1975), pp. 1349–1350.

*Primary Examiner*—Deborah L. Kyle
*Assistant Examiner*—John S. Maples
*Attorney, Agent, or Firm*—Robert Southworth, III; Judson R. Hightower

[57] ABSTRACT

A blast head including a plurality of spray nozzles mounted in a chamber for receiving a workpiece. The several spray nozzles concurrently direct a plurality of streams of a pressurized gas and abrasive grit mixture toward a peripheral portion of the workpiece to remove particulates or debris therefrom. An exhaust outlet is formed in the chamber for discharging the particulates and spent grit.

11 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DECONTAMINATION APPARATUS AND METHOD

BACKGROUND OF THE INVENTION

This invention relates generally to the fabrication of fuel pin elements employed in nuclear reactors and, more particularly, to removing radioactive contamination disposed on the exterior of finally assembled fuel pins. The United States Government has rights in this invention pursuant to contract DE-AC06-76FF02170 between the U.S. Department of Energy and Westinghouse Electric Corporation.

The reactor core of a typical nuclear reactor is designed to sustain a continuous sequence or chain of fission reactions, and generally contains a multiplicity of similarily constructed and interchangeable fuel assemblies vertically oriented in a side-by-side relation. Each fuel assembly, in turn, contains a multiplicity of thin, elongated fuel elements or pins containing a fissionable material, such as plutonium, uranium, and/or thorium for example. During reactor operation, the nuclear fuel decomposes, releasing fission products such as fission gas while generating heat in a manner well known in the art. The heat generated by these fission reactions is transferred to a suitable coolant, such as liquid sodium for example, circulating through the reactor core and is subsequently transmitted to a secondary coolant, such as water, for conversion into steam for producing electrical energy.

Each of the fuel pins is comprised of a plurality of uranium or plutonium oxide cylindrical fuel pellets, stacked end-to-end within a thin walled tube or cladding. During fabrication of these pins, the fuel pellets are loaded into the cladding through an open end thereof, followed by the insertion of various cold components therein behind the fuel pellets. This open end is then sealed by welding an end cap to the cladding.

Various methods are known for loading these fuel pellets into the cylindrical metallic sheath or cladding. Special safeguards must be practiced when loading fuel pellets formed of plutonium or reprocessed uranium compounds because of their toxic nature to preclude the release of radioactive contaminants to the atmosphere and to prevent overexposure to personnel. Older fabrication practices utilized glovebox handling procedures which required time-consuming transfers between several gloveboxes at different stations, rendering these procedures unacceptable from a mass production standpoint.

In recent years, automated fuel loading systems have been developed to transport the fuel elements between fully enclosed fabricated and assembly stations without contaminating the area outside these enclosed assembly stations. One problem encountered in these automated systems is the generation of radioactive particles settling as contamination on the exterior of the fuel pin cladding when fully assembled. Means, such as disposable swaps or fabric for example, are provided for wiping off such radioactive contamination. However, such arrangements have not been entirely satisfactory in removing all smearable and fixed radioactive surface contamination, especially from fuel pins having beveled and/or shouldered surfaces formed on the otherwise cylindrical surfaces of th fuel pins.

Accordingly, it is a primary object of the present invention to obviate the above noted shortcomings by providing a new and useful decontamination apparatus and method for efficiently removing all radioactive contaminant particles from the exterior of a nuclear fuel pin.

It is another object of this invention to provide in the foregoing apparatus a plurality of pressurized grit blast streams directed against an exterior surface of the stationary fuel pin in a manner assuring a 360° scrubbing action thereabout.

These and other objects, advantages, and characterizing features of the present invention will become clearly apparent from the ensuing detailed description of an illustrated embodiment thereof, taken together with the accompanying drawings wherein like reference numerals denote like parts throughout the various views.

SUMMARY OF THE INVENTION

A blast head having a chamber therein provided with a plurality of nozzles for emitting a pressurized gas and grit mixture toward a peripheral portion of a workpiece. The nozzles are oriented in a manner to collectively provide 360° grit contact about the peripheral portion of said workpiece. Means are provided for exhausting the particles and grit out of said chamber.

DESCRIPTION OF THE PREFERRED EMBODIMENT

Figure 1:
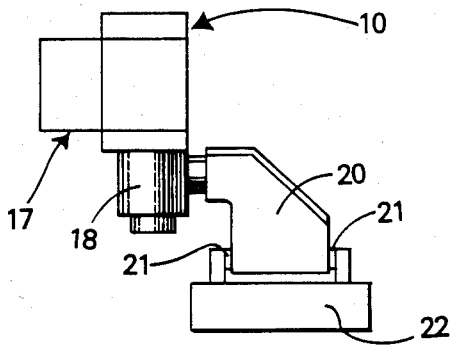
FIG. 1 is a schematic side elevational view of a decontamination apparatus incorporating the novel blast head of this invention.

Referring now in detail to the illustrative embodiment depicted in the accompanying drawings, there is shown in FIG. 1 a decontamination apparatus, comprehensively designated 10, constructed in accordance with this invention and forming a part of an automated nuclear fuel fabrication system (not shown). Since this fuel fabrication system, per se, forms no part of this invention, no further amplification or description thereof is believed necessary. The decontamination operation is performed after the fuel pin cladding has been fully loaded with fuel pellets and cold components, welded closed and subjected to certain prior decontamination processes wherein substantially the entire cylindrical surface of the finished fuel pin is automatically stripped of contaminant particles by a suitable wiping operation upstream of the apparatus 10. However, due to the special exterior configuration (FIG. 2) of the fuel pin, a certain amount of radioactive debris can remain thereon, especially on the irregular surfaces formed thereon.

Figure 2:
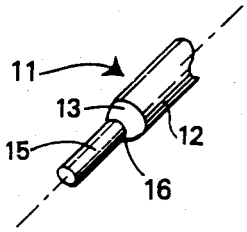
FIG. 2 is a fragmentary, perspective view of a nuclear fuel pin.

FIG. 2 illustrates an end portion of a typical fuel pin 11 of the type containing uranium or plutonium oxide cylindrical fuel pellets especially suited for use in breeder reactors. The fuel pin casing or cladding 12 is formed of a metallic alloy having good neutron economy, i.e., low neutron cross section capable of withstanding the adverse effects of thermal cycling, corrosion, irradiation and thermal creep and irradiation induced changes in material properties. The end portion of fuel pin 11, as shown in FIG. 2, has a beveled surface 13 formed between the major body portion of the pin and the reduced diameter end portion 15. It is difficult, if not impossible, to remove the radioactive surface contamination on this beveled surface 13 and the juncture 16 between surface 13 and the cylindrical surface of portion 15 by wiping or contact removal. The decontamination apparatus of this invention addresses this problem by completely removing by grit abrasion any smearable and/or fixed radioactive contamination remaining on these irregularly configurated surfaces.

The decontamination apparatus 10 comprises a blast head, generally designated 17, supported on a vertical post 18, in turn secured to a bracket 20 pivotally mounted, as by trunnions 21, on a suitable base member 22.

Figure 3:
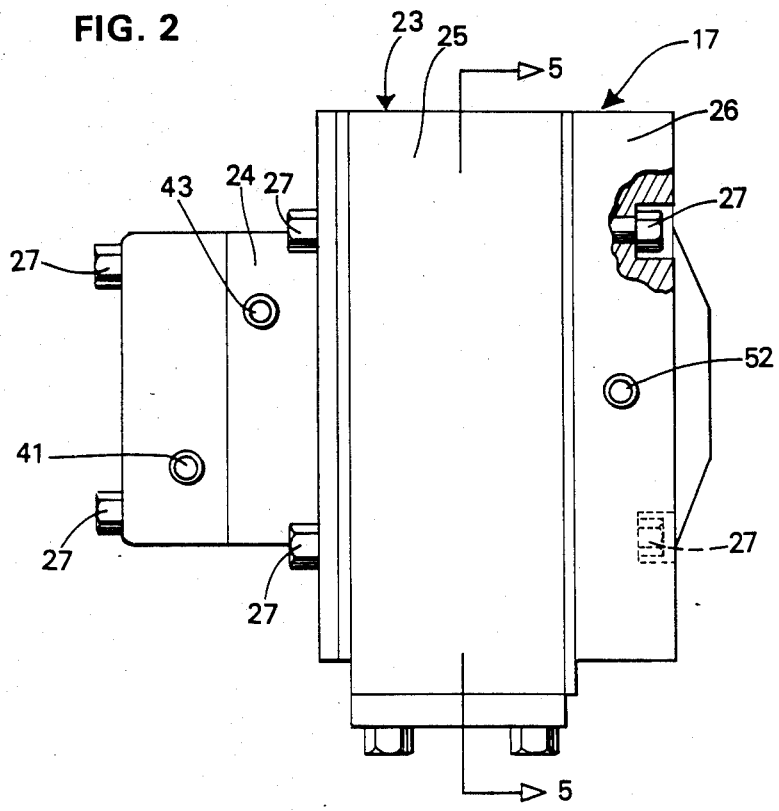
FIG. 3 is a side elevational view of a blast head constructed in accordance with this invention.
Figure 4:
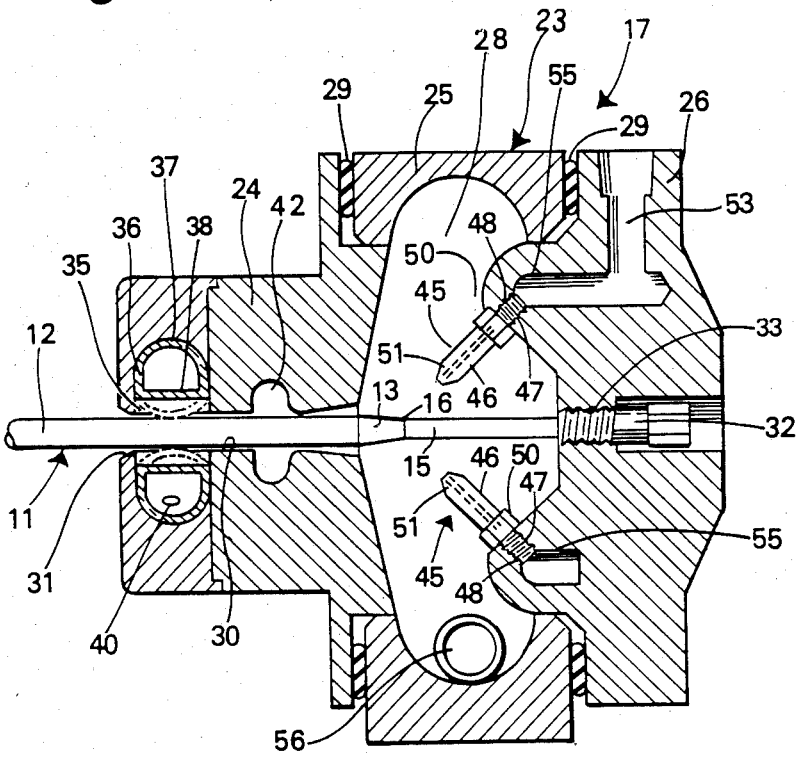
FIG. 4 is a longitudinal sectional view of the blast head of FIG. 3.
Figure 5:
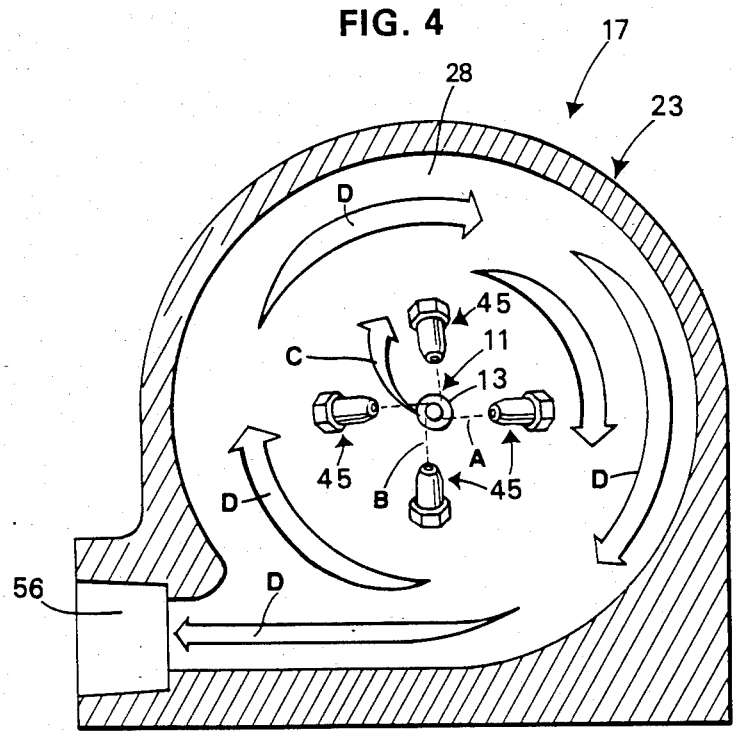
FIG. 5 is a vertical sectional view, taken along the line 5—5 of FIG. 3.

As best shown in FIGS. 3, 4 and 5, the blast head 17 comprises a composite body or housing 23 formed of a front end or first section 24, an intermediate or second section 25, and a rear end or third section 26, all connected together by suitable fasteners 27 and interiorly shaped to form a substantially continuous, specially configurated chamber 28 (FIG. 4). Suitable seals 29 are interposed between adjacent faces of the housing sections 24, 25 and 26 to provide a fluid tight relation therebetween. An axial passage 30 is formed in the section 24 of housing 23 for receiving the leading end of a fuel pin 11 admitted through inlet 31 and adapted to be inserted against an adjustable stop 32 threaded into a tapped opening 33 formed in the housing section 26. In lieu of stop 32, a photocell or other detecting device can be utilized to detect the leading end of the fuel pin 11 as it enters inlet 31 to energize a timer for controlling the final advancement of pin 11 into the desired position within chamber 28.

Housing section 24 is formed with an annular cavity 35 (FIG. 4) adapted to receive an inflatable seal 36. The seal 36 is of a generally doughnut shape having an outer peripheral portion 37 complementary in cross-sectional configuration to the shape of the outside diameter of cavity 35. The inner annular portion 38 of seal 36 is substantially flat in cross section and, when deflated, is spaced radially outwardly from the pin 11 as shown in full lines in FIG. 4. An inlet 40 is formed in seal 36 and is in communication through a housing passage (not shown) through a coupling 41 (FIG. 3) attached, via a suitable conduit (also not shown) to a source of pressurized gas, such as nitrogen for example. Seal 36 is shown in full lines in an open, deflated condition (FIG. 4) permitting passage of the fuel pin 11 therethrough and can be extended radially inwardly by the pressurized gas into a closed position, shown in phantom into pressure sealing engagement about the fuel pin 11.

Another relative small annular cavity 42 is formed in housing section 24 and is in communication through a suitable housing passage (not shown) to a coupling 43. The coupling 43 is attached, via suitable piping, to a source of pressurized gas. Thus, gas under pressure is directed into the cavity 42 against the periphery of pin 11 to form an air curtain precluding the escape of grit and radioactive particulate matter back through passage 30 into the atmosphere exteriorly of housing 22. The pressurized gas is swept forwardly along pin 11 and exits into chamber 28.

A plurality of spray nozzles 45 at equally circumferentially spaced distances are mounted in chamber 28 for directing jets or streams of a pressurized gas containing particles of a fine grit, such as sodium bicarbonate or silicon carbide for example, against the fuel pin 11. While four such nozzles 45 are utilized in the illustrated embodiment depicted in the accompanying drawings, it should be appreciated that more or less than four nozzles may be employed, if desired, as dictated by the size and configuration of the workpiece. The nozzles 45 are formed with a tungsten carbide tip of the type marketed by Comco, Inc. of Burbank, Calif.

Each nozzle is formed with a stem portion 46 projecting into the chamber 28 and a threaded formation 47 at the other or inner end for threaded engagement within a tapped opening 48 formed in housing section 26. A flat sided enlargement 50 is provided on each nozzle 45 to accommodate an appropriate tool for threading the nozzle 45 into place in tapped opening 48. Each nozzle 45 is formed with a small diameter bore 51 extending longitudinally through the center thereof. The grit and pressurized gas mixture is introduced from a suitable source into housing section 26 through a fitting 52, a housing passage 53, and an annular groove 55 common to the rear end of all of the spray nozzles 45 for establishing flow communication therewith.

A feature of this invention is the attitude or orientation of the several nozzles 45. Generally, the nozzles 45 are directed inwardly at an angle of approximately 45 degrees toward the region of beveled surface 13. However, as best shown in FIG. 5, the attitude of each nozzle 45 is slightly askew from a true vertical or horizontal plane so that its longitudinal axis or bore 51 is tangentially aligned with the periphery of fuel pin 11 at approximately juncture 16. With this orientation, a jet or stream of pressurized grit, as indicated at A in FIG. 5, emitted from one nozzle 45 for example, is directed tangentially to the periphery of pin 11 and tends to follow the contour thereof over a portion of the peripheral surface of pin 11. This flow, in conjunction with the inpingement thereagainst of the adjacent grit stream B, causes the grit stream to flow about an arcuate segment of the pin's surface as indicated by arrow C. This flowing action, when effected by the several nozzles 45, is repeated about the periphery of pin 11 to provide 360° coverage thereabout. Thus, the plurality of blast or spray streams collectively effect a scrubbing action about the entire periphery of beveled surface 13, including juncture 16, to assure complete removal of any radioactive contaminant particles therefrom.

These contaminants are carried along with the pressurized grit flow in a spiraling path of increasing diameter, as indicated by the arrows D, toward and along the peripheral wall of chamber 28 for exhaust through an outlet 56. The gas, grit, and contaminant particles are drawn out of the chamber 28 by means of a vacuum source and passed through suitable separators and filters (not shown) to separate and remove the grit and contaminant particles from the pressurized gas which can then be recycled.

In operation, a fuel pin 11 is inserted through passage 30 to a predetermined position disposing the end portion 15 within chamber 28 and properly locating the beveled surface 13 relative to the spray nozzles 45. When properly positioned, seal 36 is inflated by admitting a pressurized gas into the interior thereof, causing the seal to expand radially inwardly into pressure sealing engagement against the periphery of pin 11. Pressurized gas is then admitted into cavity 42 and directed forwardly to sweep the surface of the pin 11 and exits into chamber 28. This precludes the egress or backflow of grit and contaminant particles rearwardly toward inlet 31. Pressurized gas containing grit particles is directed through the several spraying nozzles 45 to emit streams of grit tangentially toward the beveled surface area of pin 11 for scrubbing any radioactive contaminants remaining thereon. The contaminants are carried along with the grit and gas in a vortex flow path and discharged through the exhaust outlet 56. After the pin is subjected to the plurality of grit blasts for a few seconds, say three to five seconds, the flow of the gas and grit mixture to nozzles 45, as well as the gas flow to cavity 42, are shut off. The seal 36 is then deflated and the decontaminated pin is withdrawn, completing the entire cycle within a few seconds.

Admission and termination of pressurized gas into inflatable seal 36 and cavity 42, as well as the control of the pressurized gas and grit mixture, is effected by conventional fluid control valves properly sequenced for operation preferably by an electrical timer forming a part of the control circuitry (not shown) or a controller of a programmed computer. Since such timing arrangements and controllers are known and, per se, form no part of the present invention, no further description thereof is believed necessary.

From the foregoing, it is apparent that the objects of the present invention have been fully accomplished. As a result of this invention, a decontamination apparatus and method is provided for removing all radioactive contaminant particles from a fuel pin in an automated fuel fabrication system while confining the contaminants in a controlled manner within such apparatus. By the provision of a novel blast head incorporating a plurality of specially oriented spray nozzles directing streams of pressurized grit tangentially at the periphery of the fuel pin, a 360° scrubbing action about the periphery of the pin, especially about irregular surfaces thereon, is realized to assure optimum contamination removal.

The foregoing description of a preferred embodiment of this invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of this invention and its practical application to thereby enable others skilled in the art to utilize the invention in various embodiments and with various modifications as are suited to the particular use comtemplated. It is intended that the scope of the invention be defined by the claims appended hereto.

I claim:

1. A method for removing debris from the peripheral surface of a workpiece comprising: positioning a workpiece in an enclosed chamber, directing a plurality of pressurized gas and abrasive grit steams toward a peripheral portion of said workpiece, each of said streams oriented approximately 45° toward the longitudinal axis of the workpiece and slightly askew therefrom to tangentially engage said peripheral portion of said workpiece, creating a vortex flow of gas and grit about said workpiece providing 360° grit contact thereabout, and exhausting said gas and spent grit from said chamber.

2. A method according to claim 1, wherein said workpiece comprises a nuclear fuel pin having an annular beveled surface thereon and said debris comprises radioactive contaminant particles concentrated on said beveled surface.

3. A method according to claim 1, including directing a pressurized gaseous stream along said workpiece upstream of said chamber, and exhausting said gaseous stream into said chamber.

4. A method according to claim 3, including isolating said chamber from the exterior atmosphere when a workpiece is positioned within said chamber.

5. An apparatus for removing debris from the peripheral surface of a workpiece comprising: a blast head having a housing provided with a chamber communicating with a passage for receiving a workpiece therethrough, inflatable seal means engageable about said workpiece for closing said passage, a plurality of nozzles mounted in said chamber, means for supplying a mixture of grit and pressurized gas to said nozzles, the longitudinal axis of each nozzle in side view at a 45° angle formed with the longitudinal axis of said workpiece and in end view tangentially aligned with the peripheral portion of said workpiece, said nozzles collectively producing a 360° rotary flow of grit about said workpiece periphery for scrubbing contaminant particles therefrom, and means for exhausting said particles and grit out of said chamber.

6. An apparatus according to claim 5, including gas inlet means upstream of said chamber for directing pressurized gas into said passage axially along said workpiece toward said chamber.

7. An apparatus according to claim 5, wherein said inflatable seal means is movable between a deflated condition radially spaced from said workpiece and an inflated condition engageable about the periphery of said workpiece.

8. An apparatus according to claim 5, wherein said workpiece is a nuclear fuel pin having an annular beveled surface thereon with radioactive contaminant particles concentrated on said beveled surface.

9. An apparatus according to claim 8, including gas inlet means upstream of said chamber for directing pressurized gas into said passage axially along said fuel pin toward said chamber.

10. An apparatus according to claim 9, wherein said inflatable seal means comprises an annular seal in said housing upstream of said gas inlet means movable between a deflated condition radially spaced from said fuel pin and an inflated condition engagable about the periphery of said fuel pin.

11. An apparatus according to claim 8, wherein said longitudinal axis of each of said nozzles is askew in end view relative to said fuel pin axis to direct a grit stream tangentially to the periphery of said beveled surface.

* * * * *